(12) United States Patent
Hwang

(10) Patent No.: US 7,143,761 B2
(45) Date of Patent: Dec. 5, 2006

(54) OVERHEATED STEAM OVEN

(75) Inventor: Yun Ic Hwang, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 93 days.

(21) Appl. No.: 10/844,514

(22) Filed: May 13, 2004

(65) Prior Publication Data

US 2005/0115559 A1    Jun. 2, 2005

(30) Foreign Application Priority Data

Nov. 29, 2003    (KR) ...................... 10-2003-0085931

(51) Int. Cl.
*A21B 1/08*    (2006.01)

(52) U.S. Cl. ........................ 126/20; 126/369

(58) Field of Classification Search ................ 126/369, 126/369.1, 348, 20, 33, 5; 219/401, 402; 99/330, 339
See application file for complete search history.

(56) References Cited

U.S. PATENT DOCUMENTS

| | | | |
|---|---|---|---|
| 3,604,895 A | * | 9/1971 | MacKay ..................... 219/401 |
| 4,823,767 A | * | 4/1989 | Wust ............................ 126/20 |
| 5,158,064 A | * | 10/1992 | Willis et al. .................. 126/20 |
| 5,525,782 A | * | 6/1996 | Yoneno et al. ............... 219/401 |
| 5,552,578 A | * | 9/1996 | Violi ........................... 126/369 |
| 5,715,745 A | * | 2/1998 | Blanton et al. ............... 126/20 |
| 6,909,071 B1 | * | 6/2005 | Shozo ........................ 219/401 |

FOREIGN PATENT DOCUMENTS

| | | | |
|---|---|---|---|
| JP | 8-128639 | | 5/1996 |
| JP | 2001-355844 A | * | 12/2001 |
| JP | 2002-71138 A | * | 3/2002 |

* cited by examiner

*Primary Examiner*—Josiah C. Cocks
(74) *Attorney, Agent, or Firm*—Staas & Halsey LLP

(57) ABSTRACT

An overheated steam oven designed for home use by simplifying a construction and reducing a size of the overheated steam oven, and effectively reduces heat loss due to an insulating construction thereof, and includes an overheated steam discharging structure to discharge the overheated steam to an outside of the overheated steam oven after changing the overheated steam into low temperature water to prevent the overheated steam from burning a user, thermally deteriorating or damaging items around the overheated steam oven, thus having a safety structure, reducing a size and a noise of the overheated steam discharging structure. The overheated steam oven includes a cooking cavity, an overheated steam generator to supply overheated steam into the cooking cavity, an overheated steam discharging unit to discharge the overheated steam from the cooking cavity to an outside, and a condensing unit to condense the overheated steam into water when the overheated steam is discharged from the cooking cavity to the outside.

18 Claims, 5 Drawing Sheets

OVERHEATED STEAM OVEN

CROSS-REFERENCE TO RELATED APPLICATIONS

This application claims the benefit of Korean Patent Application No. 2003-85931, filed on Nov. 29, 2003 in the Korean Intellectual Property Office, the disclosure of which is incorporated herein by reference.

BACKGROUND OF THE INVENTION

1. Field of the Invention

The present invention relates, in general, to overheated steam ovens and, more particularly, to an overheated steam oven designed for home use by simplifying a construction and reducing a size of the overheated steam oven.

2. Description of the Related Art

Generally, cooking using overheated steam is a method in which overheated steam is discharged into a cooking cavity. Since cooking using overheated steam evenly heats foods, the foods may not be partially burned, and a cooking temperature is easily controlled by controlling an amount of discharged overheated steam. Also, since oxidation of foods does not occur, cooking using the overheated steam enhances the flavor of cooked foods.

However, in Japanese Patent Laid-open Publication No. Heisei. 6-090677 and No. 2000-041852, conventional cooking apparatuses using the overheated steam include a cooking cavity to contain foods therein, a steam boiler to generate the overheated steam, a water tank to supply water into the steam boiler, and a plurality of steam pipes to discharge the overheated steam generated by the steam boiler into the cooking cavity. The construction of the cooking apparatuses is complex and the size and costs of the cooking apparatuses are increased. Accordingly, the conventional cooking apparatuses using the overheated steam are difficult to use at home due to the complex construction and the large size of the cooking apparatuses even though the cooking apparatuses are convenient for business purposes. Also, in the conventional overheated steam cooking apparatuses, the overheated steam generated by the steam boiler is discharged into the cooking cavity through the steam pipes, so that the cooking apparatuses are problematic in that heat loss increases due to use of the steam pipes.

Furthermore, in the conventional cooking apparatuses, the overheated steam used in cooking the foods is a temperature of approximately 100°~350°. Thus, the overheated steam may burn a user, or thermally deteriorate and damage items nearby the cooking apparatus, since the overheated steam is directly discharged to an outside after a cooking operation. To solve the above problems, Japanese Patent Laid-open Publication No. Heisei. 8-128639 proposed a cooking apparatus which discharges the overheated steam after combining the overheated steam with outside air in the cooking apparatus to reduce the temperature of the overheated steam. However, the above-mentioned conventional cooking apparatus requires an additional air duct and blower to draw the outside air into the cooking apparatus. Therefore, the conventional cooking apparatus is problematic in that the cooking apparatus increases a size thereof, which generates noise due to the blower.

SUMMARY OF THE INVENTION

Accordingly, it is an aspect of the present invention to provide an overheated steam oven designed for home use by simplifying a construction and reducing a size of the overheated steam oven, and effectively reduces heat loss due to an insulating construction thereof. The overheated steam oven comprises an overheated steam discharging structure to discharge the overheated steam to an outside of the overheated steam oven after changing the overheated steam into water to prevent the overheated steam from burning a user, thermally deteriorating or damaging items near the overheated steam oven, thus having a safety structure, reducing a size and a noise of the overheated steam discharging structure.

Additional aspects and/or advantages of the invention will be set forth in part in the description which follows and, in part, will be obvious from the description, or may be learned by practice of the invention.

The foregoing and/or other aspects are achieved by providing an overheated steam oven comprising a cooking cavity, an overheated steam generator to supply overheated steam into the cooking cavity, an overheated steam discharging unit to discharge the overheated steam from the cooking cavity to an outside of the overheated steam oven, and a condensing unit to condense the overheated steam into water when the overheated steam is discharged from the cooking cavity to the outside.

The overheated steam discharging unit comprises a discharging pipe through which the overheated steam passes, wherein the condensing unit is provided on the discharging pipe.

The condensing unit is integrally formed with the discharging pipe and comprises a zigzag-type pattern to increase a heat transfer surface area of the condensing unit.

The overheated steam generator comprises a steam generating vessel having an outlet connected to and communicating with the cooking cavity, wherein a predetermined amount of water is contained in the steam generating vessel, a first heater to generate steam, and installed in the steam generating vessel to be immersed in the water contained in the steam generating vessel, and a second heater mounted to an upper portion in the steam generating vessel to overheat the steam generated by the first heater.

The steam generating vessel comprises an insulating vessel.

The steam generating vessel further comprises an inner vessel part comprising the first heater and the second heater therein, and an outer vessel part which surrounds an outer surface of the inner vessel part and is spaced apart from the outer surface of the inner vessel part, wherein a space between the inner vessel part and the outer vessel part is maintained in a vacuum state.

The space between the inner vessel part and the outer vessel part comprises a shielding material to intercept radiant heat.

The first heater and the second heater each comprise a spiral shape.

The steam generating vessel further comprises a water level sensor to monitor a level of the water contained in the steam generating vessel.

Walls of the cooking cavity each comprise a multi-layered panel having a plurality of sheets spaced apart from each other to insulate the cooking cavity.

It is another aspect of the present invention to provide an overheated steam oven comprising a cooking cavity, an overheated steam generator to supply overheated steam into the cooking cavity, and a discharging pipe to discharge the overheated steam from the cooking cavity to an outside of the overheated steam oven and comprising a cooling unit to cool the overheated steam passing through the discharging pipe.

The cooling unit comprises a zigzag-type pattern to increase a heat transfer surface area of the cooling unit.

The cooling unit condenses the overheated steam discharged from the cooking cavity.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
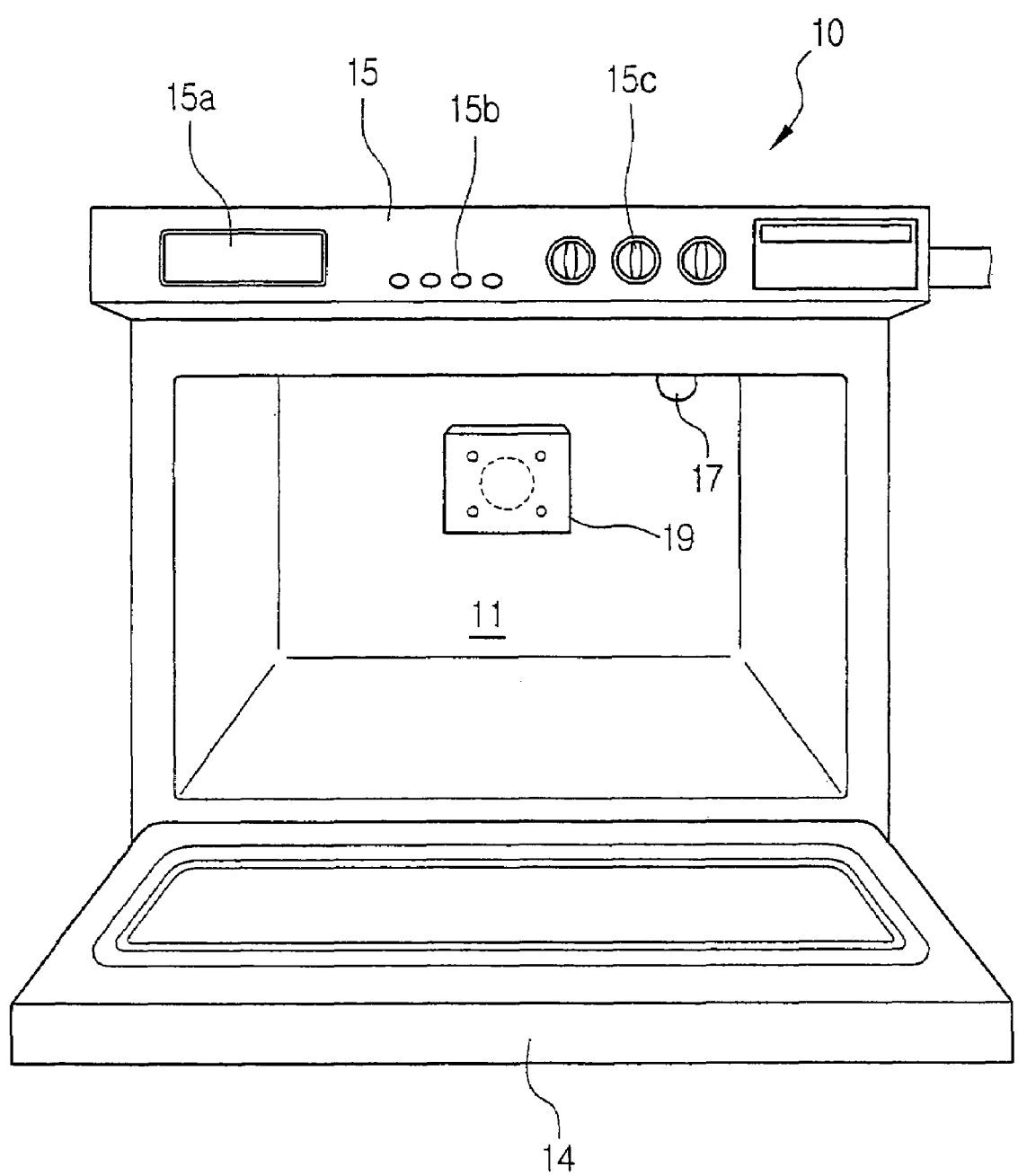
FIG. 1 is a perspective view of an overheated steam oven, according to an embodiment of the present invention.

Reference will now be made in detail to the embodiments of the present invention, examples of which are illustrated in the accompanying drawings, wherein like reference numerals refer to like elements throughout. The embodiments are described below to explain the present invention by referring to the figures.

Figure 2:
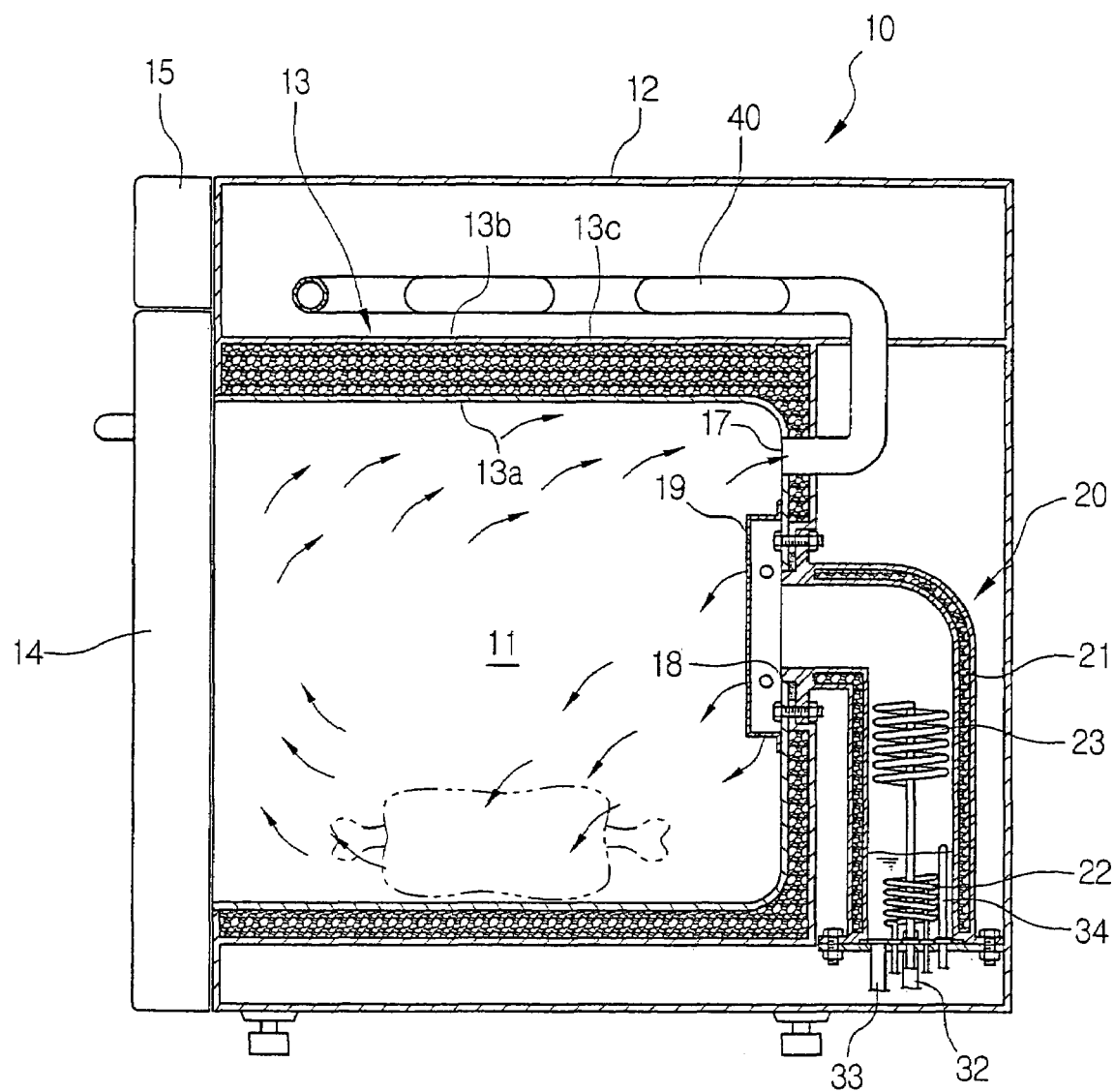
FIG. 2 is a sectional view illustrating an internal construction of the overheated steam oven of FIG. 1.

In FIGS. 1 and 2, an overheated steam oven according to an embodiment of the present invention comprises a cabinet 10 to define a cooking cavity 11 therein, and an overheated steam generator 20 mounted to a rear wall in the cabinet 10 to supply overheated steam into the cooking cavity 11.

The cabinet 10 comprises an outer casing 12, and an inner casing 13 which is installed in the outer casing 12 and spaced apart from the outer casing 12, to define the cooking cavity 11 therein. The cooking cavity 11 is open at a front thereof to insert and remove foods into and from the cooking cavity 11. Also, the inner casing 13 comprises a first casing 13a and a second casing 13b spaced apart from each other to insulate the cooking cavity 11 from an outside of the cooking cavity 11. An insulating material 13c fills the space between the first casing 13a and the second casing 13b. That is, walls of the cooking cavity 11 each comprise a multi-layered panel having a plurality of sheets spaced apart from each other, and the insulating material 13c fills the space between the multi-layered panels.

A door 14, which is opened downward and closed upward, is attached to the open front of the cabinet 10 to allow a user to open and close the cooking cavity 11. A control unit 15 is provided at a portion of the cabinet 10 above the door 14 and comprises a display 15a to display an operational state of the overheated steam oven thereon, various kinds of control buttons 15b, and control switches 15c.

Figure 3:
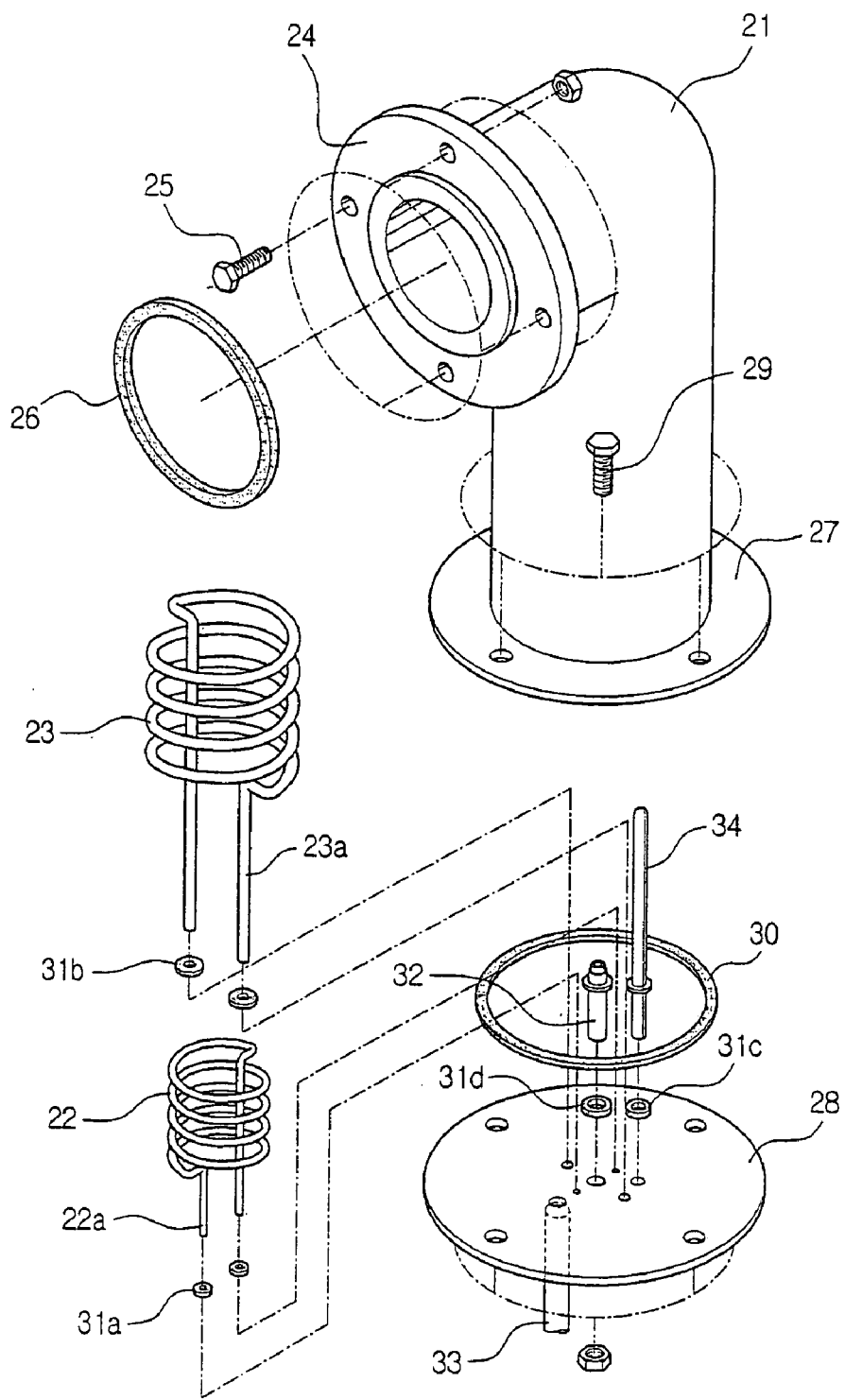
FIG. 3 is an exploded perspective view illustrating a construction of an overheated steam generator of the overheated steam oven of FIG. 2.

In FIGS. 2 and 3, the overheated steam generator 20 is provided on the rear wall of the cooking cavity 11, and comprises a steam generating vessel 21 having an outlet connected to a steam inlet port 18 provided on the rear wall of the cooking cavity 11, wherein a predetermined amount of water is contained in the steam generating vessel 21. The overheated steam generator further comprises a first heater 22 mounted to a lower portion in the steam generating vessel 21, and a second heater 23 mounted to an upper portion in the steam generating vessel 21.

Figure 4:
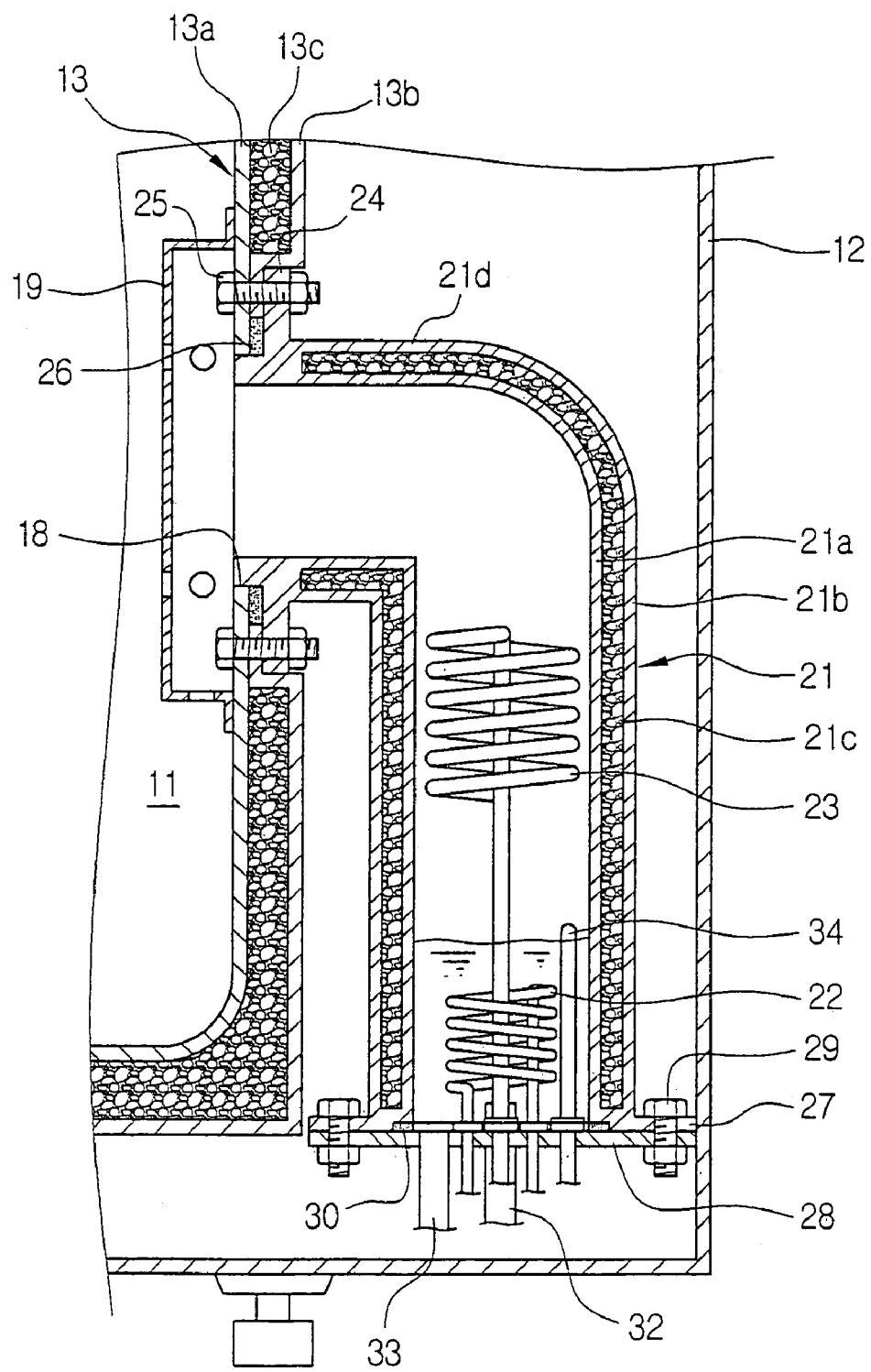
FIG. 4 is a sectional view illustrating the construction of the overheated steam generator of the overheated steam oven of FIG. 2.

In FIGS. 3 and 4, the steam generating vessel 21 comprises a vacuum insulating vessel having a space therein insulated from an outside thereof to minimize heat loss. The steam generating vessel 21 further comprises an inner vessel part 21a, and an outer vessel part 21b which surrounds an outer surface of the inner vessel part 21a and is spaced apart from the outer surface of the inner vessel part 21a. A space between the inner vessel part 21a and the outer vessel part 21b comprises a shielding material 21c to intercept radiant heat. The space between the inner vessel part 21a and the outer vessel part 21b is sealed in a vacuum state, once the vacuum state is induced.

The steam generating vessel 21 further comprises a bent part 21d formed by bending an upper end of the steam generating vessel 21 toward the rear wall of the cooking cavity 11. A front end of the bent part 21d comprises an outlet of the steam generating vessel 21 and is connected to the steam inlet port 18 provided on the rear wall of the cooking cavity 11. An upper flange 24 provided around the outlet of the steam generating vessel 21, is mounted to a predetermined portion of the inner casing 13 around the steam inlet port 18 by a plurality of locking members 25, with a first packing 26 interposed between the upper flange 24 and the inner casing 13 to prevent the leakage of steam. A cover 19 having a plurality of steam discharging holes, is mounted to an inner surface of the rear wall of the cooking cavity 11 to allow the overheated steam generated by the overheated steam generator 20 to pass into the cooking cavity 11.

The steam generating vessel 21 further comprises a lower flange 27 at a lower end thereof, wherein a lower plate 28, which closes an opening of the lower end of the steam generating vessel 21, is mounted to the lower flange 27 by a plurality of locking members 29. A second packing 30 is interposed between the lower plate 28 and the lower flange 27 to prevent the leakage of water from the steam generating vessel 21.

The first heater 22 mounted to the lower portion in the steam generating vessel 21, and the second heater 23 mounted to the upper portion in the steam generating vessel 21, each comprise a spiral shape to maximize a heat transferring surface area. First and second terminals 22a and 23a, are respectively provided at the first and second heaters 22 and 23, and are extended downward, and supported by the lower plate 28. Accordingly, the first and second heaters 22 and 23 are supported on the lower plate 28. Also, third and fourth packings 31a and 31b each are respectively interposed between the first and second terminals 22a and 23a of the first and second heaters 22 and 23 and the lower plate 28 to prevent the leakage of water from the steam generating vessel 21. When the predetermined amount of water is fed into the steam generating vessel 21, the first heater 22, provided at the lower portion of the steam generating vessel 21, is immersed in the water contained in the steam generating vessel 21, and the second heater 23, provided at the upper portion of the steam generating vessel 21, is located above the water, which is contained in the steam generating vessel 21 and reaches a maximum water level. Due to the above-mentioned construction, the overheated steam is generated by allowing the second heater 23 to further heat the steam generated by an operation of the first heater 22 while the steam rises toward the outlet of the steam generating vessel 21.

Also, a feed pipe 32 to feed water into the steam generating vessel 21, a drain pipe 33 to drain the water from the steam generating vessel 21, and a water level sensor 34 to monitor a level of the water contained in the steam generating vessel 21, are respectively mounted to the lower plate 28 of the steam generating vessel 21. A fifth packing 31$d$ is provided between the feed pipe 32 and the lower plate 28 to prevent the leakage of water from the steam generating vessel 21. A sixth packing 31$c$ is provided between the water level sensor 34 and the lower plate 28 to prevent the leakage of water from the steam generating vessel 21. The feed pipe 32 is connected to an external water source (not shown). The feed pipe 32 comprises a feed control valve (not shown) to control an amount of water supplied from the external water source (not shown) into the steam generating vessel 21. The level of the water contained in the steam generating vessel 21 is maintained by controlling the amount of the water supplied from the external water source (not shown) into the steam generating vessel 21, in response to a monitoring operation of the water level sensor 34. In addition, a drain control valve (not shown) is provided on the drain pipe 33 to drain the residual water from the steam generating vessel 21 after a cooking operation.

Figure 5:
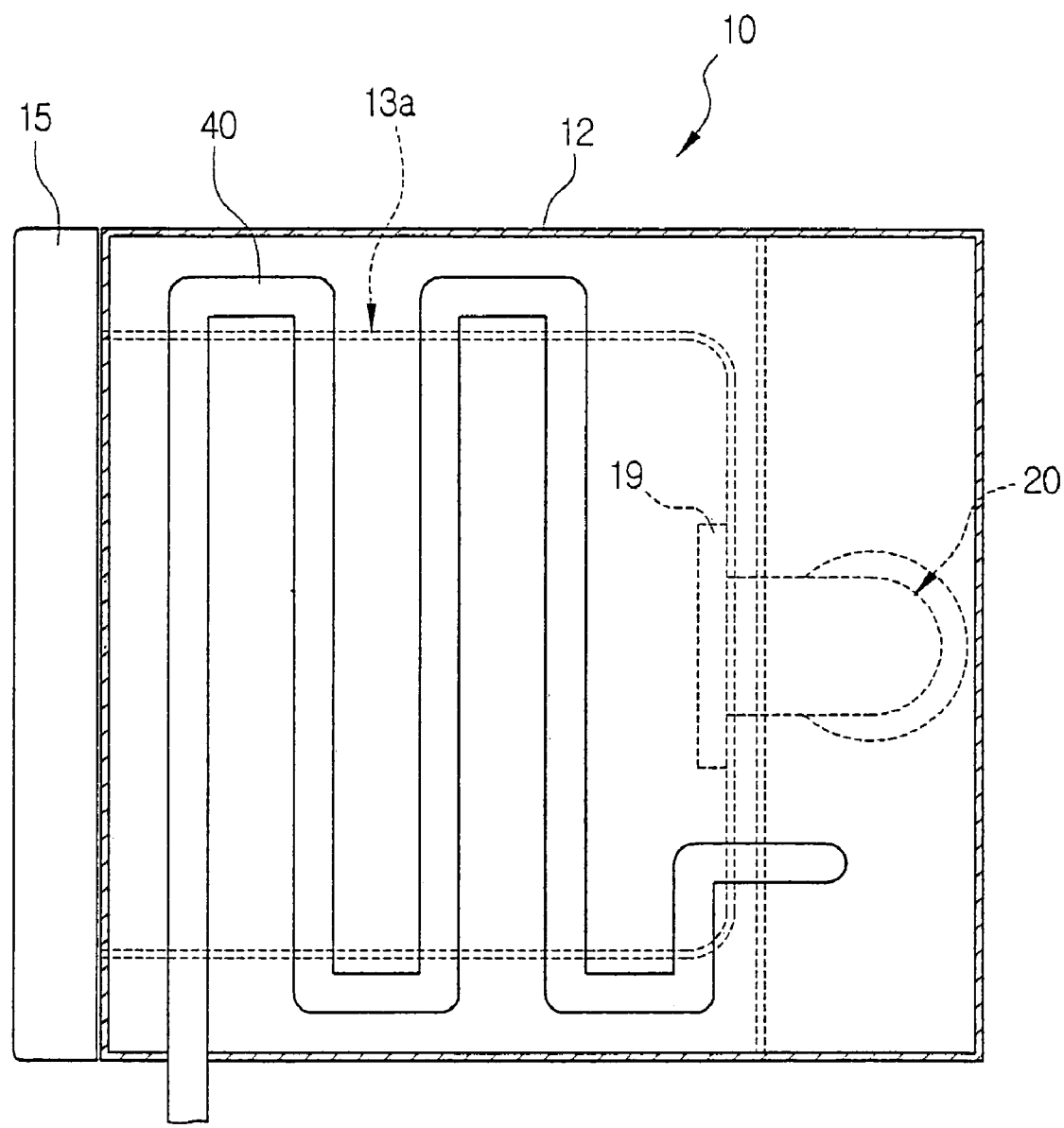
FIG. 5 is a top view of the overheated steam oven of FIG. 2.

In FIGS. 2 and 5, the overheated steam oven of the present invention further comprises a discharging port 17 formed on an upper portion of the rear wall of the inner casing 13 to discharge the overheated steam of the cooking cavity 11 after the cooking operation. The overheated steam further oven comprises a discharging pipe 40, having a first end coupled to the discharging port 17 to communicate with the cooking cavity 11, and a second end which extends to the outside of the outer casing 12. The discharging pipe 40 comprises a zigzag-type pattern in a space defined between a top wall of the inner casing 13 and a top wall of the outer casing 12 while extending from the discharging port 17 to the outside, to increase a heat transfer surface area of the discharging pipe 40.

Due to the above-mentioned structure of the discharging pipe 40 with the increased heat transfer surface area, the overheated steam is quickly cooled and condensed into water while passing through the discharging pipe 40. Therefore, the discharging pipe 40 operates as a cooling unit or a condensing unit which cools or condenses the overheated steam passing through the discharging pipe 40. The discharging pipe 40 comprises a length which is sufficiently long such that the overheated steam passing through the discharging pipe 40 is discharged to the outside after most of the steam has condensed into water.

The operation of the overheated steam oven of the present invention will be described hereinbelow.

First, foods are placed on the cooking trays 16 of the cooking cavity 11. After, the overheated steam oven is operated and the water is fed into the steam generating vessel 21 through the feed pipe 32 of the overheated steam generator 20. The water level in the steam generating vessel 21 is then controlled in response to the monitoring operation of the water level sensor 34. After a predetermined amount of water is fed into the steam generating vessel 21, the water contained in the steam generating vessel 21 is heated by the first heater 22 to generate steam. Overheated steam is generated by further heating the steam using the second heater 23 while the steam rises in the steam generating vessel 21. The overheated steam is supplied into the cooking cavity 11 through the outlet of the steam generating vessel 21. And, the foods in the cooking cavity 11 are cooked by the heat of the overheated steam. After cooking is finished, the overheated steam is discharged to the outside of the cooking cavity 11 through the discharging pipe 40. At this time, the overheated steam passing through the discharging pipe 40 is condensed into water by the heat transfer between the overheated steam and the outside air, prior to being discharged to the outside.

In the above-mentioned operation, since the steam generating vessel 21 comprises an insulating construction and the outlet of the steam generating vessel 21 is mounted to the rear wall of the cooking cavity 11, the overheated steam oven of the present invention generates overheated steam while minimizing heat loss. In addition, since the overheated steam oven of the present invention rapidly supplies overheated steam into the cooking cavity 11, the energy loss is further minimized. Also, since the first heater 22, which comprises a spiral shape, is immersed in the water contained in the steam generating vessel 21, the overheated steam oven of the present invention rapidly boils the water in the steam generating vessel 21. Also, since the second heater 23, which comprises a spiral shape, further heats the steam, the overheated steam oven of the present invention generates the overheated steam within a short period of time while reducing energy requirements.

As apparent from the above description, in an overheated steam oven of the present invention, since an overheated steam generator is mounted on a rear wall of a cooking cavity and the construction of the overheated steam generator is simple in comparison with steam boilers of conventional overheated steam cooking apparatuses, the present invention creates a simplified manufacturing process of the overheated steam oven and a reduction of the manufacturing costs of the overheated steam oven. In addition, the overheated steam oven of the present invention may be used at home by simplifying a construction and reducing a size of the overheated steam oven.

Also, since a steam generating vessel of the overheated steam generator comprises an insulating construction, the overheated steam oven of the present invention generates overheated steam while minimizing heat loss. Since an outlet of the steam generating vessel is directly connected to the rear wall of the cooking cavity, the overheated steam oven of the present invention rapidly supplies the overheated steam into the cooking cavity.

Furthermore, since each of walls of the cooking cavity comprises a multi-layered panel having a plurality of sheets spaced apart from each other, the overheated steam oven of the present invention further minimizes heat loss.

In addition, the overheated steam oven of the present invention comprises an overheated steam discharging structure to discharge the overheated steam to the outside after changing the overheated steam into water, thus preventing the overheated steam from burning a user, thermally deteriorating or damaging items around the overheated steam oven. Furthermore, the overheated steam oven of the present invention reduces a size and noise thereof, since the overheated steam oven does not require any additional air duct or any additional blower.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An overheated steam oven, comprising:
a cooking cavity;
an overheated steam generator to supply overheated steam into the cooking cavity;
an overheated steam discharging unit positioned at an upper rear surface of an interior of the cooking cavity, to discharge the overheated steam from the cooking cavity to an outside of the overheated steam oven; and comprising:
a condensing unit connected with the overheated steam discharging unit and extending across an upper external surface of the cooking cavity in a zig-zag type pattern such that the condensing unit extends across multiple portions of the upper external surface beyond a width of the interior of the cooking cavity, to condense the overheated steam into water when the overheated steam is discharged from the cooking cavity to the outside.

2. The overheated steam oven of claim 1, wherein the overheated steam discharging unit comprises a discharging pipe through which the overheated steam passes, wherein the condensing unit is provided on the discharging pipe.

3. The overheated steam oven of claim 2, wherein the condensing unit is integrally formed with the discharging pipe and the zigzag-type pattern increases a heat transfer surface area of the condensing unit.

4. The overheated steam oven of claim 1, wherein the overheated steam generator comprises:
a steam generating vessel having an outlet connected to and communicating with the cooking cavity, wherein a predetermined amount of water is contained in the steam generating vessel;
a first heater to generate steam, and installed in the steam generating vessel to be immersed in the water contained in the steam generating vessel; and
a second heater mounted to an upper portion in the steam generating vessel to overheat the steam generated by the first heater.

5. The overheated steam oven of claim 4, wherein the steam generating vessel comprises an insulating vessel.

6. The overheated steam oven of claim 5, wherein the steam generating vessel comprises:
an inner vessel part comprising the first heater and the second heater therein; and
an outer vessel part which surrounds an outer surface of the inner vessel part and is spaced apart from the outer surface of the inner vessel part, wherein a space between the inner vessel part and the outer vessel part is maintained in a vacuum state.

7. The overheated steam oven of claim 6, further comprising:
a shielding material filling the space between the inner vessel part and the outer vessel part to intercept radiant heat.

8. The overheated steam oven of claim 4, wherein the first heater and the second heater each comprise a spiral shape.

9. The overheated steam oven of claim 4, further comprising:
a water level sensor installed in the steam generating vessel to monitor a level of the water contained in the steam generating vessel.

10. The overheated steam oven of claim 1, wherein walls of the cooking cavity each comprise a multi-layered panel having a plurality of sheets spaced apart from each other to insulate the cooking cavity.

11. An overheated steam oven, comprising:
a cooking cavity;
an overheated steam generator to supply overheated steam into the cooking cavity; and
a discharging pipe to discharge the overheated steam from the cooking cavity to an outside of the overheated steam oven and comprising a cooling unit to cool the overheated steam passing through the discharging pipe, wherein the discharging pipe extends along an upper external surface of the cooking cavity in a zigzag-type pattern such that the discharging pipe extends across multiple portions of the upper external surface beyond a width of an interior of the cooking cavity.

12. The overheated steam oven of claim 11, wherein the zigzag-type pattern increases a heat transfer surface area of the cooling unit.

13. The overheated steam oven of claim 12, wherein the cooling unit condenses the overheated steam discharged from the cooking cavity.

14. The overheated steam oven of claim 11, further comprising a steam inlet port provided on a rear wall of the cooking cavity, wherein the overheated steam generator is provided at a rear wall of the cooking cavity and comprises a steam generating vessel having an outlet connected to the steam inlet port.

15. The overheated steam oven of claim 14, wherein the overheated steam generator further comprises:
a first heater mounted to a lower portion in the steam generating vessel to generate steam and to be immersed in water contained in the steam generating vessel; and
a second heater mounted to an upper portion in the steam generating vessel to overheat the steam generated by the first heater.

16. The overheated steam oven of claim 15, further comprising:
a feed pipe to feed water into the steam generating vessel;
a drain pipe to drain the water from the steam generating vessel; and
a water level sensor to monitor a level of the water contained in the stem generating vessel.

17. The overheated steam oven of claim 11, further comprising a discharging port, wherein a first end of the discharging pipe is coupled to the discharging port to communicate with the cooking cavity and a second end extends to the outside of the cooking cavity.

18. The overheated steam oven of claim 17, wherein the discharging pipe is of a predetermined length to allow the overheated steam passing through the discharging pipe to be discharged to the outside after the overheated steam is condensed into water.

* * * * *